July 18, 1961
C. D. MILLER
2,992,532
CONTROL DEVICE
Filed Nov. 25, 1959
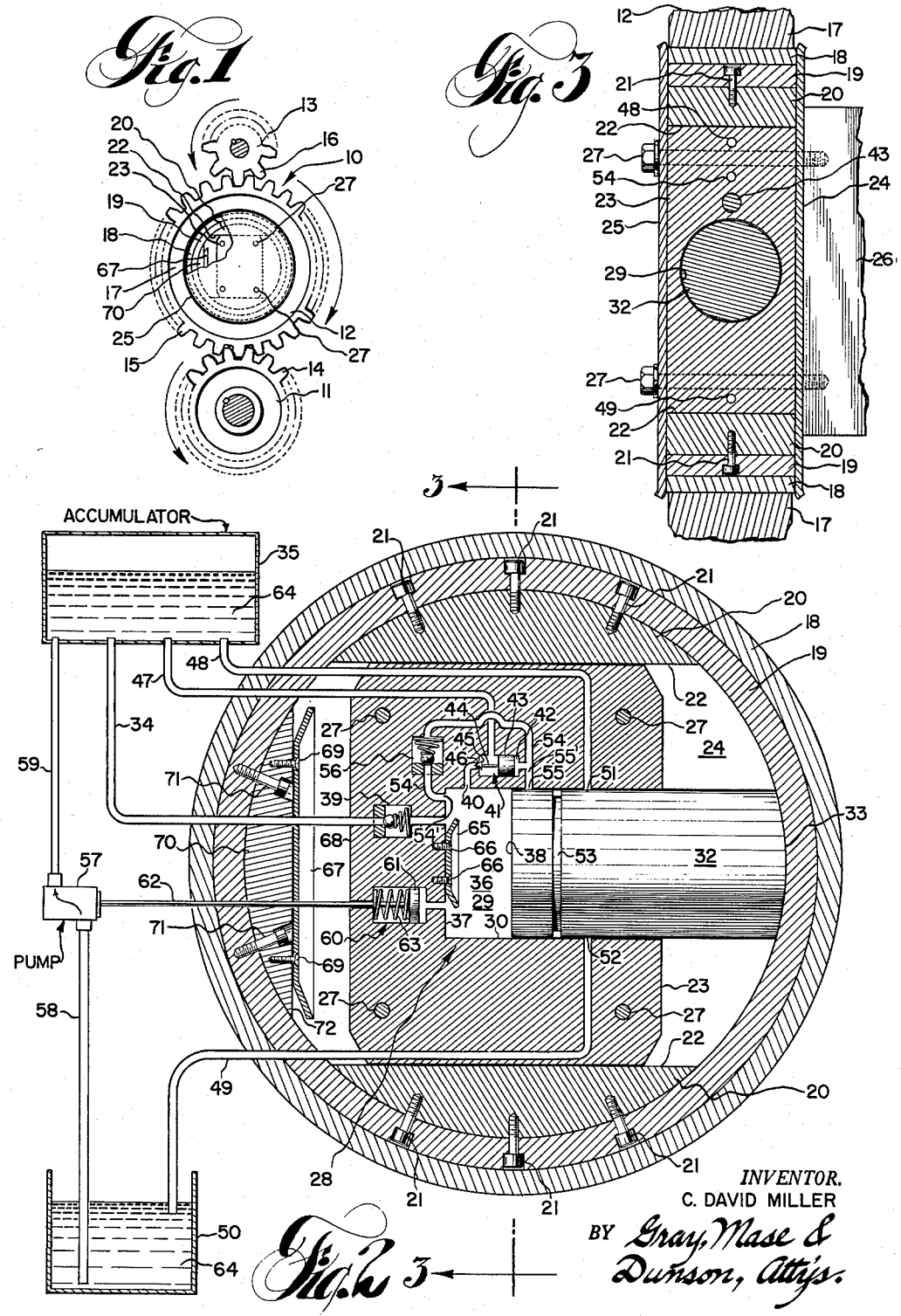
INVENTOR.
C. DAVID MILLER
BY Gray, Mase &
Dunson, Att'ys.

United States Patent Office 2,992,532
Patented July 18, 1961

2,992,532
CONTROL DEVICE
Carl David Miller, Columbus, Ohio, assignor, by mesne assignments, to The Cooper Bessemer Corporation, Mount Vernon, Ohio, a corporation of Ohio
Filed Nov. 25, 1959, Ser. No. 855,292
6 Claims. (Cl. 60—51)

This invention relates to a control device. More particularly, it relates to a control device wherein a fluid under pressure is used to sense conditions tending to cause fluctuations in a transmitted force and to operate fluid control means, which responsively minimizes the fluctuations of force. This control device is particularly advantageous when used in conjunction with gear transmissions for the control of torque fluctuations imposed on a driven gear member by a driving gear member. Another embodiment of this invention is that revealed in copending patent application entitled "Control Device," Serial No. 464,454, filed October 25, 1959 (now Patent No. 2,918,826, dated December 29, 1959), of which this is a continuation-in-part.

Briefly, this control device comprises: a housing having a cylindrical bore at one end, which may also serve as a support member for a gear of a transmission; a piston reciprocal in the cylinder bore, which, with the bore, provides a fluid chamber in the housing, and is connected to operating means outside the housing, which is subject to fluctuations in the forces that are to be controlled; a fluid inlet to the chamber; and a fluid outlet from the chamber which is provided with an adjustable valve, the adjustment of which is responsive to relatively long-term variations in the average force to be controlled.

This control device operates through the use of a fluid supplied under pressure to the chamber to move the piston against the force when the force tends to decrease, and to allow the force to move the piston in the opposite direction when the force tends to increase. Fluid flow is controlled through the device by means of valves in the inlet and outlet. Fluid control means is provided over the action of the valve means to control on a relatively long-term basis the amount and direction of movement of the piston in response to fluctuating force minimums and maximums.

While the control device of this invention may be used in various types of equipment which require the control of forces, it is particularly advantageous in conditions where it is necessary to prevent fluctuating forces from reversing. In such conditions, the control device of this invention may be used to control the fluctuating force in a range of positive values.

These conditions exist in a gear transmission wherein the driving gear, without use of this device, would be subject to force or torque fluctuations of a magnitude sufficient to cause loss of tooth contact between the driving and driven gear. This often occurs because the driven gear and equipment possess sufficient inertia to carry them ahead of the driving gear during recession to minimum torque. Even with modern methods of shaping gear teeth, this problem, which is commonly known as "backlash," is acute in large high-power installations.

The control device of this invention provides an effective means of controlling the torque transmitted to the driven gear to a positive amount and, thus, to prevent backlash in gear transmissions. This is accomplished by providing fluid operated means of moving the center of rotation of the intermediate gear substantially parallel to the tangent to the gear tooth pitch line at the point of contact between the gears.

Accordingly, it is an object of this invention to provide a control device that will respond to conditions tending to cause fluctutations in force to control the force by fluid means. It is an object to provide a control device that will respond to fluctuations in force to control the position of a piston in the cylinder and, thus, to control the force. It is a further object to provide a fluid piston-cylinder control device that will adjust for over-compensation in either direction of piston travel. It is still a further purpose to provide a fluctuating force control device for a power transmission that will control variations in torque from the driving member to the driven member.

It is a purpose of this invention to provide a torque control device for a gear transmission that is adapted by fluid means to prevent backlash between mating gear teeth. It is a further purpose to provide a fluid piston-cylinder control device of such compact design that it may be disposed in the hub of a gear in a gear transmission.

To these and other ends, this invention comprises apparatus, a preferred form of which is disclosed in the following description and attached drawings. Although the apparatus and structure described and shown in detail refer with particularity to a control device in a gear transmission, it is apparent that this invention is not limited thereto, but may be used for other purposes where its features are advantageous.

In the drawings:

FIG. 1 is a partially diagrammatic elevational view of a gear transmission having a control device of this invention;

FIG. 2 is a schematic sectional elevational view of the control device of this invention and FIG. 3 is a sectional elevational view taken along the line 3—3 of FIG. 2.

Referring to FIG. 1, a gear transmission designated generally as 10 comprises a driving gear 11, an intermediate gear 12, and a driven gear 13. Driving gear 11 has teeth 14 partially shown; intermediate gear 12 has teeth 15 partially shown; and driven gear 13 has teeth 16 partially shown. Intermediate gear 12 is provided with a hub portion 17 of increased cross-sectional area as shown in FIG. 3. A babbitt-lined bearing shell 18 is pressfitted into the hub portion 17. The bearing shell 18 is rotatably mounted on an annular axle member 19. A pair of oppositely disposed segments 20 are fastened within the inner perimeter of the axle member 19 by suitable means such as screws 21, as shown in FIG. 2. The segments 20 are provided with oppositely disposed parallel bearing surfaces 22, which are adapted to slide transversely on a support block 23. The support block 23 serves as a control-unit housing and a cylinder block.

Axial movement of the gear 12, bearing shell 18, axle member 19, and segments 20, is prevented by an inner retainer plate 24 and an outer retainer plate 25. The support block 23, retainer plate 24, and a retainer plate 25 are held in assembly and fastened to a frame member 26 by a plurality of bolts 27. The frame member 26 may be any suitable portion of a gear-transmission assembly according to conventional practice.

The support block 23 forms a housing for a control unit, designated generally as 28, as shown in FIG. 2. The support block 23 is provided with a transverse cylindrical bore 29 having a bore surface 30 in one end of the block 23. A piston 32 is adapted to slide transversely in the cylinder bore 29 and is adapted to press against the axle member 19 at one end 33.

From the apparatus as described, it will be seen that as the piston 32 reciprocates in the cylinder bore 29, the axle member 19, with the segments 20 attached thereto, slides transversely on the support block 23 at the bearing surfaces 22. In this manner the center of rotation of the gear is moved transversely. When the amount of torque delivered by the driving gear 11 fluctuates and its angle of velocity changes in correspondence to these fluctuations, the center of rotation of the gear 12 may move to the right or left to compensate. For instance, when the rotational speed at the pitch circle of the teeth 14 decreases in response to a decrease in torque of the gear 11, the gear 12 may be moved transversely in the direction opposite to the direction of tooth travel to prevent separation of tooth contact between teeth 14 and teeth 15. Backlash between teeth 14 and the teeth 15 may thus be prevented.

The control unit 28 is housed in the support block 23, a fluid inlet tube 34 is connected between an accumulator 35 and a fluid chamber 36 formed by the bore surface 30, end 37 of the cylinder bore 29 and an end 38 of the piston 32. Check valve means 39 is provided between the fluid passage 34 and the chamber 36.

Since FIG. 2 is a schematic elevational view, it is understood that the various fluid passages, such as fluid inlet tube 34, providing communication between the external apparatus, such as the accumulator 35, and the control unit 28, are represented as directly connected for descriptive convenience. In actual construction such communication connections may be made through the outer retainer plate 25.

An outlet fluid passage 40 is provided in the support block 23 to an adjustable valve 41 housed in the support block 23 comprising a cylindrical chamber 42 and a valve operating member 43. The valve operating member 43 is adapted to reciprocate in the chamber 42 and is provided at one end with a portion of reduced diameter 44, preferably terminating in a valve or conical tip 45 which is adapted to engage in mating seat 46 of the support block 23, thus providing a means of fluid control to the outlet passage 40. An outlet tube 47 is provided in communication with the valve 41 and the accumulator 35. Pressure release tubes 48 and 49 are in communication with the accumulator 35 and the fluid sump 50, respectively, to the bore 29. These tubes 48 and 49 enter the bore 29 through ports 51 and 52, respectively, which are preferably axially aligned. The piston 32 is provided with groove 53 which is capable, upon proper alignment with the ports 51 and 52 by reciprocation of the piston 32 in block 23, of placing the accumulator 35 in communication with the sump 50.

A fluid passage 54 having an opening 54′ at the end 37 of the chamber 36 communicates with the adjustable valve chamber 42 and a second fluid passage 55′ is provided from the adjustable valve chamber 42 to a port 55 opening into the bore 29. The port 55 is axially positioned at a smaller distance from the end 37 than the ports 51 and 52. Check valve means 56 is provided in the fluid passage 54. A pump 57 of conventional design is provided in fluid communication with the sump 50 and the accumulator 35 through the suction tube 58 and the discharge tube 59, respectively. Pump actuating means, designated generally as 60, such as a plunger 61 connected by a rod 62 to the pump 57 and being urged by resilient means such as a spring 63 toward the bore 29, is provided in the end 37.

A fluid 64 is provided in the sump 50 and the accumulator 35 as well as all other internal recesses of the control unit 28. The accumulator 35 performs in a conventional fashion to store the fluid 64 under pressure imposed by air compressed in the accumulator 35 above the fluid 64. It may be desirable to provide means for insuring a continuous source of air in the accumulator, as such systems often become dead after a period of time because of absorption of the air by the fluid. The sump is preferably open to the atmosphere and serves as a fluid storage reservoir.

The control unit of this invention operates in the following manner:

Assuming that the rotation of the driving gear 11, as seen in FIG. 1, is counterclockwise, force fluctuation maximums occur in a direction toward the left, and force fluctuation minimums will occur toward the right, in FIG. 2. Fluid 64 is supplied to the chamber 36 at the pressure which exists in the accumulator 35. This pressure in the chamber 36 varies according to the force applied toward the left to the piston 32. The fluctuation of pressure within the chamber 36 caused by the fluctuation in force applied to the piston 32, reciprocates the plunger 61 which, in turn, operates the pump 57. The pump 57 delivers fluid from the sump 50 to the accumulator 35 raising the accumulator 35 and system fluid pressure. As the pressure in chamber 36 increases in accordance with the pressure in the accumulator 35 and system pressure, the valve 41 will be moved to a more open position by reciprocation of the valve operating member 43 to compensate for the pressure increase. Eventually, the pressure within the accumulator chamber should reach a valve sufficient to apply a continuous force to the end 38 of the piston 32 equal to the mean of the fluctuating forces applied to the piston 32. The valve 41 is wide open under these conditions, and the piston operates as a pump, driving a small amount of fluid to the control unit on each force fluctuation cycle against a negligible pressure difference. Under continuous operation in which the average value of the fluctuating force is constant, the pressure within the chamber 36 will become substantially constant throughout a force fluctuation cycle, and the operation of the pump consequently ceases.

During periods of decreasing average torque fluctuations, such as during rapid deceleration of a gear train in which the invention is used, the piston 32 will work its way to the right urged by the higher pressure in the chamber 36. When the end of the piston 38 partially uncovers port 55, the pressure in chamber 42 is relieved allowing valve operating member 43 to move to the right. This lowers the pressure fluctuation average in chamber 36, and the progress of the piston to the right will stop, if the external force of the piston 32 is high enough. If the average pressure in the chamber 36 remains high enough to move the piston 32 to the right, progress will continue. When the piston has moved so far to the right that the groove 53 is aligned with the ports 51 and 52, the fluid in accumulator 35 will be in direct communication with the sump 50 which contains fluid at atmospheric pressure and the pressure in the accumulator will be relieved. During periods of more moderate deceleration to meet a different load and speed requirement, the piston 32 will move to the right only far enough to re-establish a new constant average pressure in the chamber 36 required by the changed average force condition on the piston 32 and port 55 will not be uncovered.

During periods of rapid acceleration and under overload conditions, the piston 32 will work its way to the left in the support block 23. As the fluctuating force average between force minimums and maximums increases, fluid is forced through valve 56 into chamber 42. An increase in pressure in chamber 42 forces valve operating member 43 to the left decreasing the amount of fluid flow from chamber 36. This causes the pressure in chamber 36 to increase further which resists the movement of the piston 32 to the left during successive fluctuations. If pressure variations are great between force maximum and force minimum in each fluctuation, the pump 57 will operate to increase pressure in the accumulator 35 producing a further increase of average pressure in chamber 36. If the pressure increase is enough in chamber 36 to meet the force imposed by the piston 32 for the acceleration conditions under which the control unit 28 is operating, the piston will stop working its way to the left and reciprocate back and forth in substantially the same position. This will continue until the average of the force minimums and maximums changes. However, if the increasing fluctuating force average increases beyond the capacity of the pump to build up pressure in accumulator 35, the piston 32 will progress to the left until it covers the entrance to outlet passage 40, at which time, since the fluid cannot exit from chamber 36 to increase the pressure in the accumulator 35, the piston 32 works against an incompressible fluid preventing further travel to the left.

As soon as the fluctuating force average decreases, to a value below the force exerted on piston 32 by the fluid pressure in chamber 36, the piston will progress to the right.

Resilient means such as a Belleville spring 65 is provided at the end 37 of the cylinder bore 29 to cushion over-travel of the piston 32 toward that end 37 in the event the fluid control unit should fail. The Belleville spring 37 is fastened with flat-headed screws 66 or other suitable means. Similarly, a Belleville spring 67 is provided at one end 68 of the support block 23 to cushion over-travel of the axle member 19 toward the support block 23, in the event the fluid control unit 28 should fail. The Belleville spring 67 is fastened with flat-headed screws 69 or other suitable means. A segment 70 is fastened to the axle member 19 by a screw 71 or other suitable means. The segment 70 is provided with a flat surface 72 upon which the spring 71 is fastened.

During the periods of operation when the average rotational speed of the gears and the gear train 10 is constant, the piston 32 reciprocates to the right and left alternately at each fluctuation to and from maximum and minimum force positions, respectively, maintaining a position approximately as shown in FIG. 2. However, during periods of acceleration or deceleration when the average speed of the gear train changes, the piston 32 travels further to the right or left during one fluctuation cycle between force maximums and minimums than it does in the opposite direction. The adjustable valve mechanism 41 is provided to prevent this unequal movement from accumulating to the extent that spring 65 or 67 is engaged.

It is preferred that the fluid used in the control unit be a liquid, because the control unit 28 has greater sensitivity due to the relative incompressibility of a liquid. However, in some circumstances, other fluids may be adequate.

In the past, backlash control devices wherein the center of rotation of a gear is moved transversely in a manner similar to the device of this invention have been used; however, in such prior devices a resilient member, such as a coil spring, is provided to react to fluctuating forces. In these prior devices, the spring stores the energy during the maximum force portion of the fluctuating force cycle and releases this energy to shift the center of rotation of the gear transversely against the decreasing force during the minimum portion of the cycle. Such "spring"-operated devices are characterized by the disadvantage that the natural frequency of oscillations of the spring member may be in resonance with the force fluctuations at some rotative gear speeds. This has a tendency to cause excessive vibration unless dampening means is provided for the spring member. The provision of dampening means for the spring member reduces the sensitivity of the device without providing for adjustment for various rotative speeds. The device of this invention overcomes these characteristics of prior devices by providing a control unit which adjusts to meet changing force conditions caused by vibrations in average rotative speeds of the power transmission. Further, a spring element of prior devices is necessarily large in comparison to the control unit of this invention when equal force capacities are considered. The fluid-operated control unit of this invention is relatively compact in comparison and may be adapted to fit into the hub of a conventional sized gear.

It will be understood, of course, that, while the forms of the invention herein shown and described constitute preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts, may be substituted without departing from the spirit or scope of the invention herein disclosed and claimed.

In the claims:

1. A device for controlling operative means having fluctuating force characteristics in opposite directions comprising: a housing having a cylinder bore at one end; a piston reciprocal in said cylinder bore providing a fluid chamber in said housing and connected to said operative means; a fluid inlet to said chamber; a fluid outlet from said chamber provided with valve means adjustable responsively to said fluctuating force to control movement of said piston in said cylinder; fluid pressure energy storage means in communication with said valve means and said inlet; means, in communication with said fluid pressure energy storage means, operable to increase the pressure in said fluid pressure energy storage means in response to pressure variations in said chamber; and means operable by said piston to decrease the pressure in said fluid pressure energy storage means.

2. A device for controlling operative means having fluctuating force characteristics in opposite directions comprising: a housing having a cylinder bore at one end; a piston reciprocal in said cylinder bore providing a fluid chamber in said housing and connected to said operative means; a fluid inlet to said chamber; a fluid outlet from said chamber provided with valve means adjustable responsively to said fluctuating force to control movement of said piston in said cylinder; an accumulator in communication with said valve means and said fluid inlet; a pump in communication with said accumulator and operable in response to pressure variations in said chamber to increase the pressure in said accumulator; and fluid passage means operable by said piston to decrease the pressure in said accumulator.

3. A device for controlling operative means having fluctuating force characteristics in opposite directions comprising: a housing having a cylinder bore at one end; a piston reciprocal in said cylinder bore providing a fluid chamber in said housing and connected to said operative means; a fluid inlet passage to said chamber at the inner end of said cylinder bore having check valve means to prevent back-flow through said inlet; a fluid outlet passage from said chamber; an adjustable valve assembly in said fluid outlet passage comprising a valve and valve operating member reciprocal in said housing to restrict said outlet passage; a fluid passage from said chamber, at a position longitudinally spaced from said fluid outlet toward said inner end of said cylinder bore, to the controlling end of said valve operating member; a second fluid passage from the controlling end of said valve operating member into said chamber at a position spaced from said fluid outlet longitudinally away from said inner end of said cylinder bore; fluid pressure energy storage means in communication with said valve means and said inlet; means, in communication with said fluid pressure energy storage means, operable to increase the pressure in said fluid pressure energy storage means in response to pressure variations in said chamber; and means operable by said piston to decrease the pressure in said fluid pressure energy storage means.

4. A device for controlling operative means having fluctuating force characteristics in opposite directions comprising: a housing having a cylinder bore at one end; a piston reciprocal in said cylinder bore providing a fluid chamber in said housing and connected to said operative means; a fluid inlet passage to said chamber at the inner end of said cylinder bore having check valve means to prevent back-flow through said inlet; a fluid outlet passage from said chamber; an adjustable valve assembly in said fluid outlet passage comprising a valve and valve operating member reciprocal in said housing to restrict said outlet passage; a fluid passage from said chamber, at a position longitudinally spaced from said fluid outlet toward said inner end of said cylinder bore, to the controlling end of said valve operating member; a second fluid passage from the controlling end of said valve operating member into said chamber at a position spaced from said fluid outlet longitudinally away from said inner end of said cylinder bore; an accumulator in communication with said valve means and said fluid inlet; a pump in communication with said accumulator and operable in response to pressure variations in said chamber to increase the pressure in said accumulator; and fluid passage means operable by said piston to decrease the pressure in said accumulator.

5. A device for controlling operative means having fluctuating force characteristics in opposite directions comprising: a housing having a cylinder bore at one end; a piston reciprocal in said cylinder bore providing a first fluid chamber in said housing and connected to said operative means; a fluid inlet passage to said first chamber at the inner end of said cylinder bore having check valve means to prevent fluid back-flow through said inlet; a fluid outlet passage in said cylinder bore from said first chamber; an adjustable valve assembly in said fluid outlet passage having a valve closure member reciprocable in said housing to restrict said outlet passage, and a second piston in a second chamber in said housing operable to move and adjust said valve closure member; a fluid passage from said first chamber, at a position longitudinally spaced from said fluid outlet toward said inner end of said cylinder bore, to said second chamber; a second fluid passage from said second chamber into said first chamber at a position spaced from said fluid outlet longitudinally away from the said inner end of said cylinder bore; an accumulator in communication with said valve means and said fluid inlet; a pump in communication with said accumulator and operable in response to pressure variations in said first chamber to increase the pressure in said accumulator; and fluid passage means operable by said piston to decrease the pressure in said accumulator.

6. A device for controlling operative means having fluctuating force characteristics in opposite directions comprising: a cylinder block; a piston reciprocable in said cylinder block, providing a fluid chamber in said cylinder block and connected to said operative means outside said cylinder block; a fluid inlet to said chamber connected to a source of fluid under pressure, and entering said chamber; a fluid outlet from said chamber provided with a valve having adjustment means operable to modulate the flow of fluid through said outlet; a first fluid communication means from said adjustment means of said valve to an opening in said chamber that is longitudinally removed from an optimum position of said piston as moved by said fluctuating force in one direction, and a second fluid communication means from said adjustment means of said valve to an opening in said chamber that is longitudinally removed from the optimum position of said piston as moved by said fluctuating force in the opposite direction, said optimum positions of said piston being between said first and second fluid communication means openings in said chamber; said communication means to adjust said valve and modulate flow therethrough in accordance with the pressure in said chamber as the piston progresses in either of said opposite directions; said fluid inlet to said chamber being located longitudinally without the portion of said chamber embraced by said fluid communication means openings; an accumulator in communication with said valve means and said fluid inlet; a pump in communication with said accumulator and operable in response to pressure variations in said chamber to increase the pressure in said accumulator; and fluid passage means operable by said piston to decrease the pressure in said accumulator.

References Cited in the file of this patent

UNITED STATES PATENTS

| | | |
|---|---|---|
| 1,480,257 | Gerlinger | Jan. 8, 1924 |
| 1,905,133 | Bishop et al. | Apr. 25, 1933 |